June 28, 1955 G. H. BIRCHALL, JR., ET AL 2,711,846
VALVED GLASS VESSELS SUCH AS BURETTES
Filed April 17, 1951 5 Sheets-Sheet 1
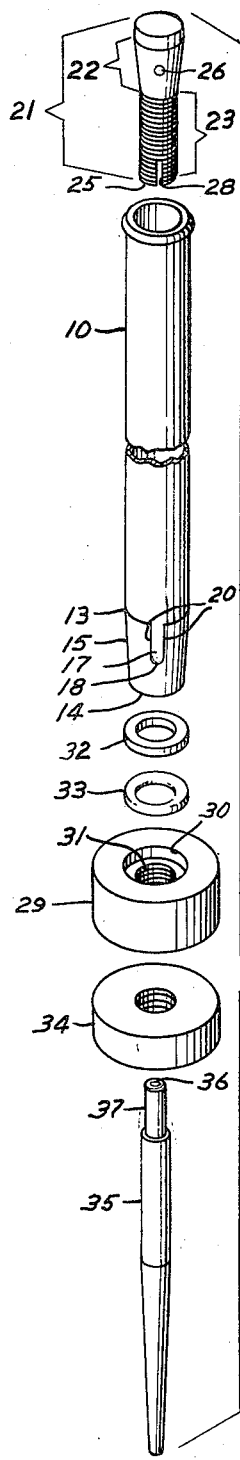
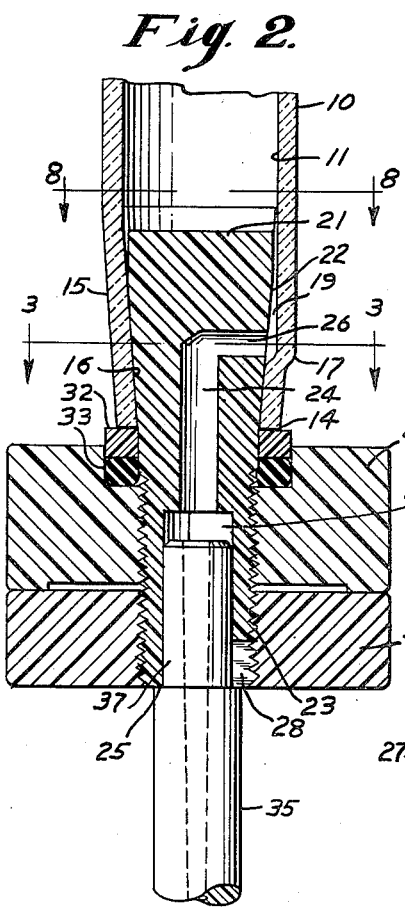
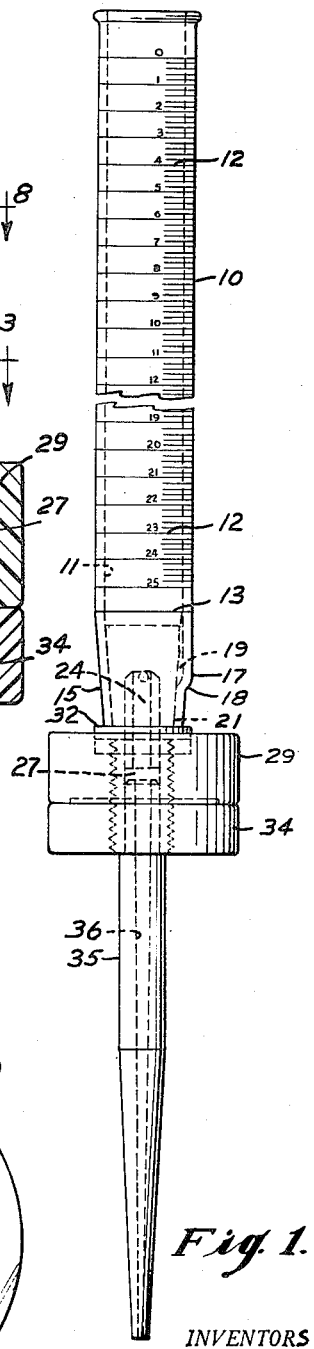
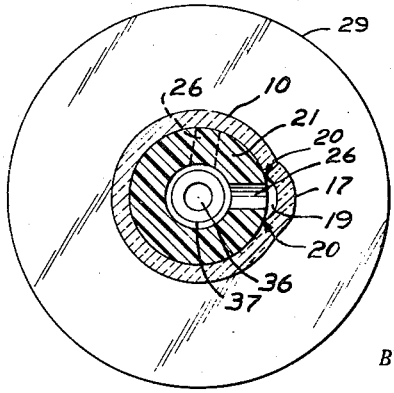
Fig. 1.
Fig. 2.
Fig. 3.
Fig. 4.
INVENTORS
George H. Birchall, Jr.
James A. Purdy
BY Leonard L. Kalish
ATTORNEY June 28, 1955    G. H. BIRCHALL, JR., ET AL    2,711,846
VALVED GLASS VESSELS SUCH AS BURETTES
Filed April 17, 1951    5 Sheets-Sheet 2
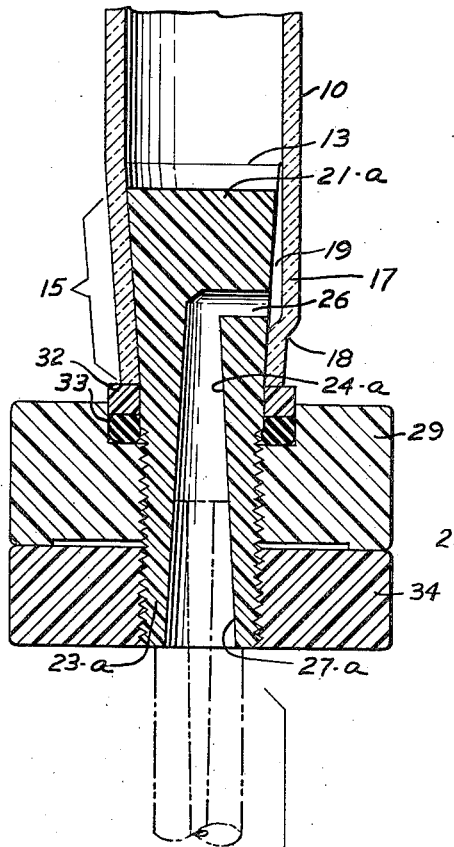
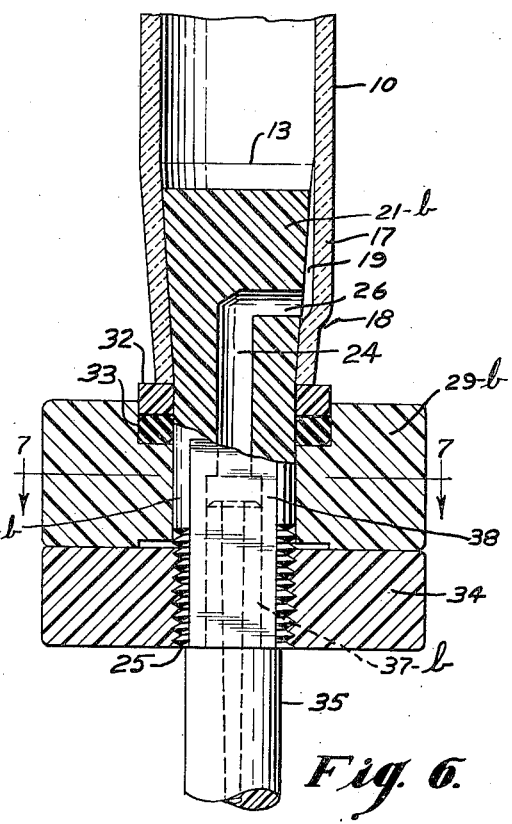
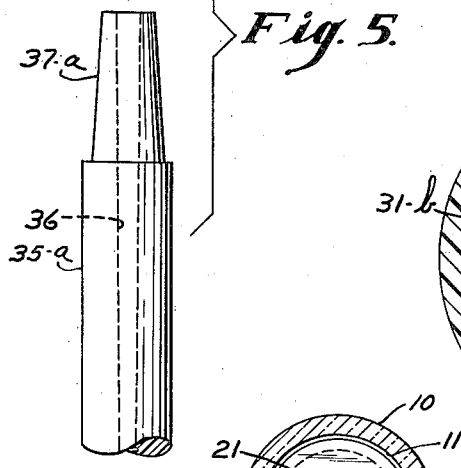
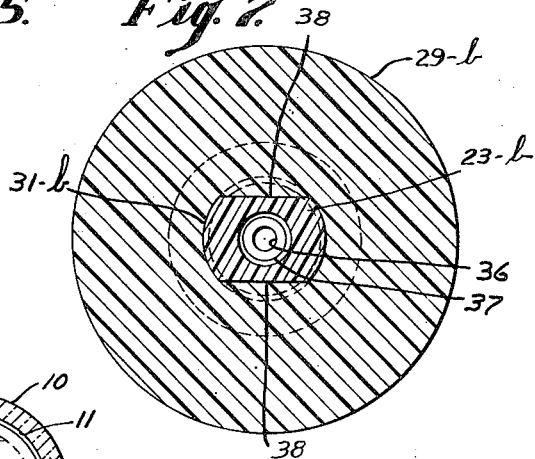
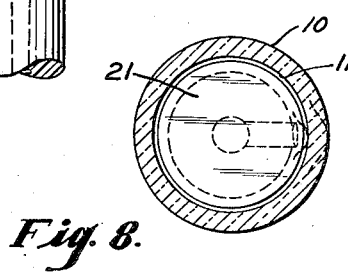
INVENTORS
George H. Birchall, Jr.
James A. Purdy
BY
Leonard L. Kalish
ATTORNEY.

June 28, 1955     G. H. BIRCHALL, JR., ET AL     2,711,846
VALVED GLASS VESSELS SUCH AS BURETTES
Filed April 17, 1951     5 Sheets-Sheet 3

INVENTORS
George H. Birchall, Jr.
James A. Purdy
BY Leonard L. Kalish
ATTORNEY.

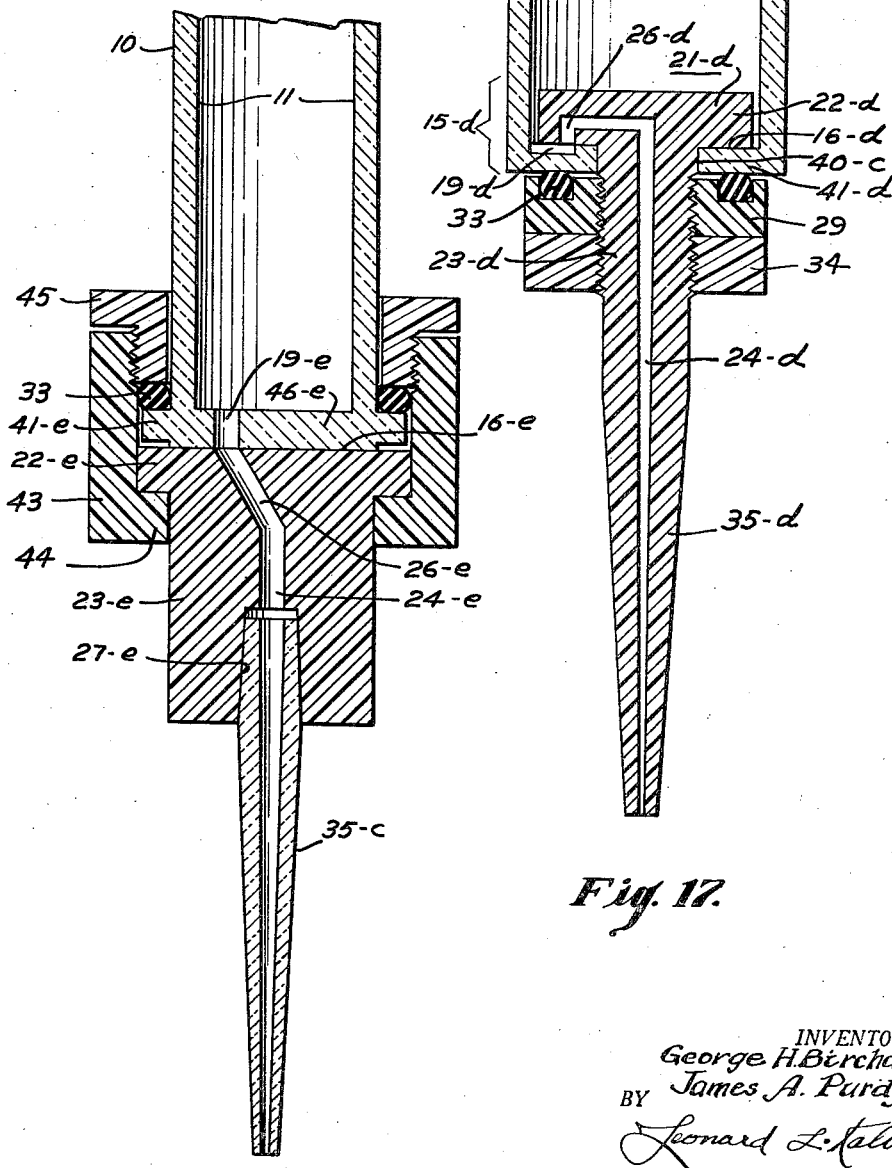

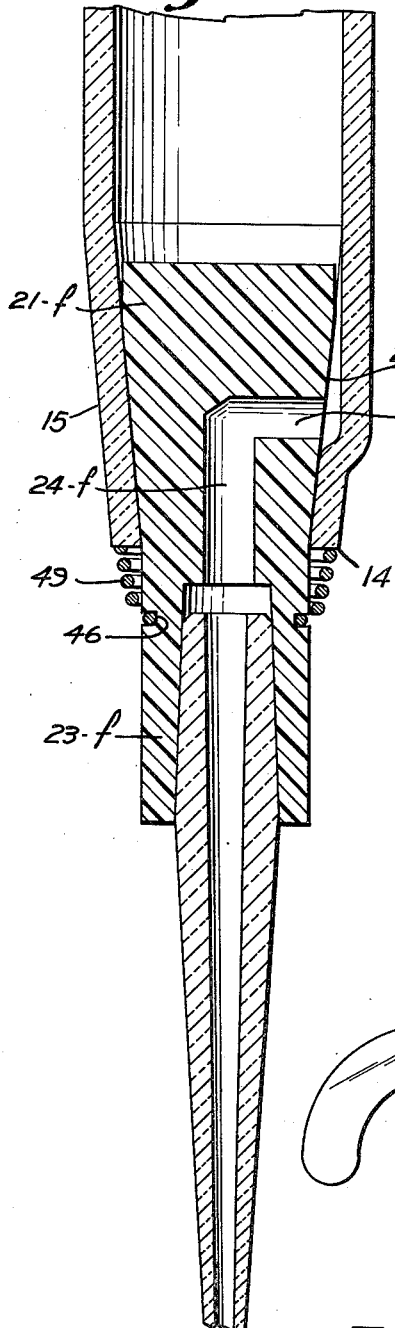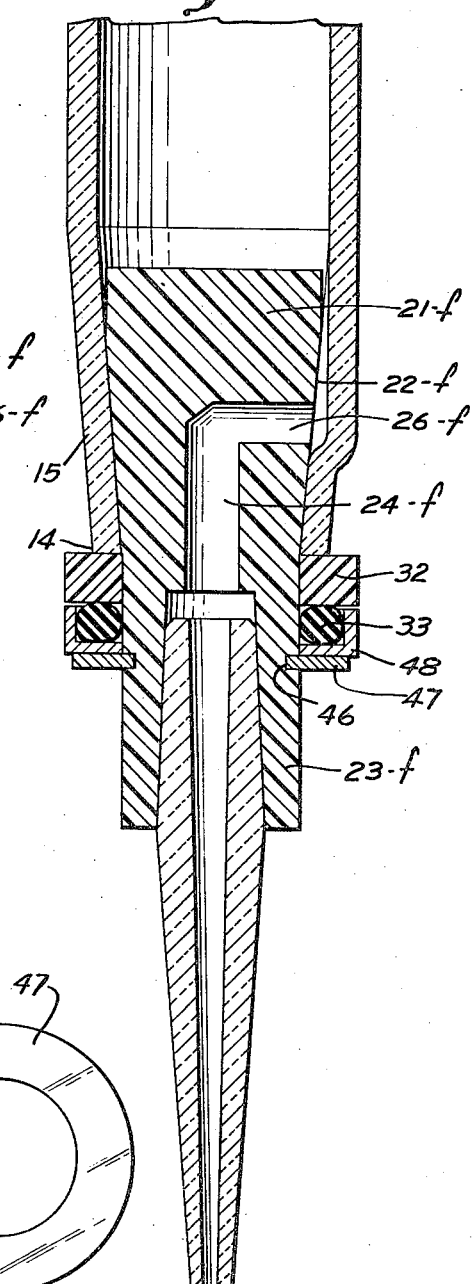

United States Patent Office 2,711,846
Patented June 28, 1955

2,711,846
VALVED GLASS VESSELS SUCH AS BURETTES

George H. Birchall, Jr., Westfield, N. J., and James A. Purdy, Abington, Pa., assignors to Fischer & Porter Company, Hatboro, Pa., a corporation of Pennsylvania Application April 17, 1951, Serial No. 221,402

35 Claims. (Cl. 222—158)

The present invention relates generally to valved vessels such as burettes and like devices for delivering liquids in accurately controlled quantities; including burettes or the like for use with highly corrosive chemicals.

An object of the present invention is to provide a burette construction which is simple and inexpensive to manufacture, with flow-control mechanism capable of operating without the need for stopcock grease or lubricant and capable of handling highly corrosive chemicals.

Other objects and advantages of the present invention are apparent in the following detailed description, appended claims and accompanying drawings.

In conventional burettes, heretofore employed, the stopcock portion constitutes a separate and distinct element having an expensive transversely-disposed tapered ground valve-seat in which a correspondingly tapered and ground, diametrically bored valve-plug is rotatably mounted; stopcock grease or like lubricant being often required to permit rotation of the valve-plug. The elongated generally cylindrical graduated body of the burette and the lowermost dispensing tip or nozzle are separately formed and are then fused to the stopcock portion in communicating relationship with the valve-seat, so that rotation of the valve-plug brings its port into and out of registration with the ports in the body and in the dispensing tip, so as to start and stop the flow of fluid.

The formation of this separate valve-seat with its ground seating surface and the assembly of this separate valve-seat to the body and the dispensing tip of the burette represent a large portion of the cost of manufacture of a conventional burette. The necessity for a ground stopcock plug also adds appreciably to the cost.

Additionally, the necessity for using stopcock grease or other lubricant intermediate the stopcock plug and the valve-seat limits the usefulness of conventional burettes since they cannot be employed in dispensing corrosive chemicals (of which there are a considerable number) which are capable of attacking and physically or chemically deteriorating the grease or lubricant, and sometimes also the ground valve-seat surface and the ground valve-plug surface, so as to result in sticking of the stopcock plug and leakage.

According to the present invention, a simple and inexpensive burette is provided which eliminates the shortcomings of conventional burettes and which dispenses with the need for a separate ground valve-seat and which requires neither a ground valve-plug nor a lubricant, and which can be used with many highly corrosive chemicals with which conventional burettes cannot be employed.

In one embodiment, the burette construction of the present invention includes a tapered glazed valve-seat which is generally co-axial and formed integrally with and in direct continuation of the body of the burette and which valve-seat is provided with a generally axially extending fluid-passageway or by-pass, spaced outwardly from the valve-seat, and a valve-plug having a tapered valve-surface cooperating with the valve-seat, said valve-plug being generally co-axial with the body of the burette and having an axial bore and a connecting generally radial passageway terminating in an outer port, constructed and arranged so that said port may be brought into and out of registration and communication with the fluid-passageway or by-pass of the valve-seat; the valve-plug being constructed of chemically-inert synthetic resin which is self-lubricating and which is relatively form-retaining but is capable of yielding somewhat under pressure so that when tensioned axially toward the smaller end of the valve-seat, it will form a fluid-tight seal with the valve-seat while, at the same time, permitting ready rotation of the valve-plug to open or closed position.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents an elevational view of a burette forming one embodiment of the present invention.

Figure 2 represents a fragmentary vertical cross-sectional view, on an enlarged scale, of the embodiment of Figure 1, showing the valve mechanism.

Figure 3 represents a horizontal cross-sectional view taken generally along the line 3—3 of Figure 2.

Figure 4 represents an exploded perspective view of the embodiment of Figures 1–3, showing the various elements making up the burette.

Figure 5 represents a fragmentary vertical cross-sectional view of a modified embodiment of the present invention with the delivery tip shown in disconnected position.

Figure 6 represents a cross-sectional view generally like that of Figure 2 but showing still another embodiment of the present invention.

Figure 7 represents a cross-sectional view generally along the line 7—7 of Figure 6.

Figure 8 represents a section on line 8—8 of Figure 2.

Figure 10:
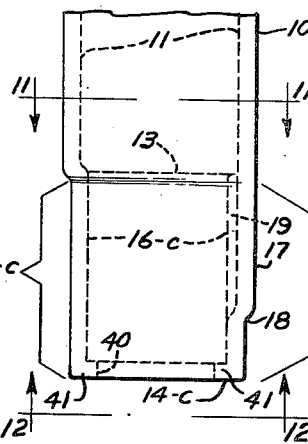
Figure 10 represents a front elevational view of the lower end of the burette of the embodiment shown in Fig. 9.
Figure 11:
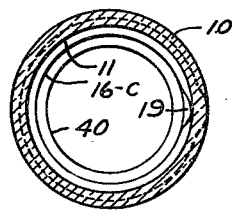
Figure 11 represents a section on line 11—11 of Figure 10.
Figure 12:
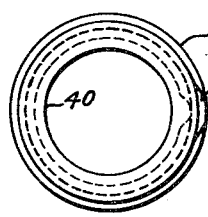

Fifure 12 represents a view on line 12—12 of Figure 10.

Figure 9:
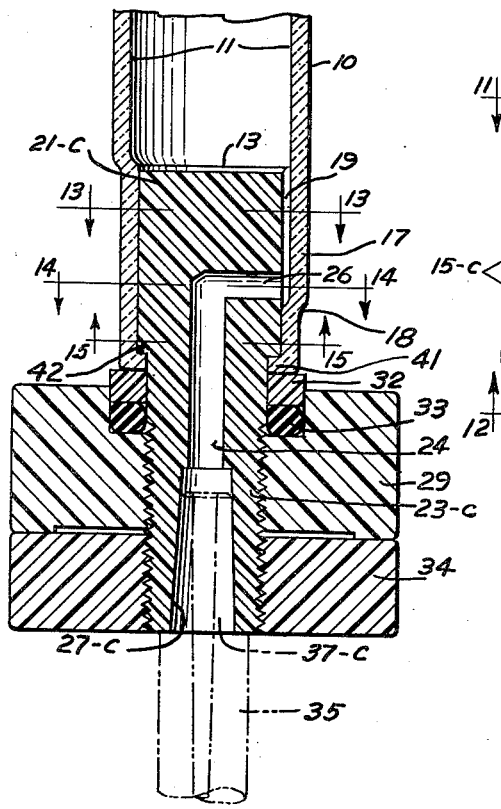
Figure 9 represents a vertical cross-section, similar to that shown in Figures 2, 5 and 6, of another embodiment of the present invention.
Figure 13:
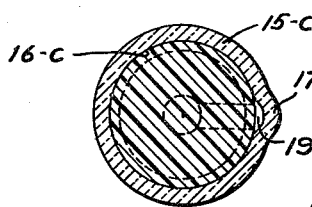

Figure 13 represents a section on line 13—13 of Figure 9.

Figure 14:
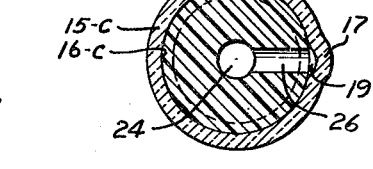

Figure 14 represents a section on line 14—14 of Figure 9.

Figure 15:
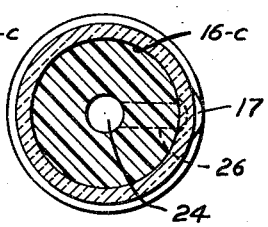

Figure 15 represents a section on line 15—15 of Figure 9.

Figure 16:
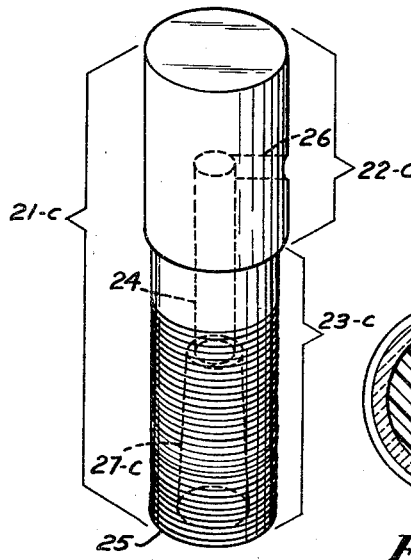

Figure 16 represents a perspective view of the valve-plug of the embodiment shown in Figures 9 to 15, inclusive.

Figure 17 represents a vertical cross-sectional view of the lower portion of a burette, showing another embodiment of the present invention.

Figure 18 represents a vertical cross-section of the lower portion of the burette, showing another embodiment of the present invention.

Figure 19 represents a vertical sectional view, similar to Figures 2, 5, 6 and 17, showing another embodiment of the present invention.

Figure 20 represents a plan view of the generally U-shaped snap-ring or locking-ring shown in section in Figure 19.

Figure 21 represents a vertical sectional view, similar to Figures 2, 5, 6, 17 and 19, showing another embodiment of the present invention.

In one embodiment of the present invention, shown in Figure 1, the burette of the present invention includes an elongated generally tubular body 10, preferably formed of transparent vitreous material which is hard, resistant to chemical action and capable of being provided with a smooth glazed inner surface or bore. I prefer to form the body 10 of chemically resistant glass, such as Pyrex, although other vitreous materials, such as quartz, can also be used.

The inner surface or bore 11 of the body 10 is preferably cylindrical throughout all but its lowermost end which, as will be described more fully hereinbelow, forms the valve-seat of the burette. As indicated particularly in Figure 1, a plurality of vertically spaced graduations 12 may be engraved or etched or otherwise formed upon the outside of the body 10 to indicate the quantity of liquid delivered by the burette, in a manner well known in the art. The graduations 12 may indicate cubic centimeters or cubic millimeters or any other units of liquid measure.

Beginning at a line 13, spaced a short distance up from its lowermost end 14, the body 10 may be formed with a downwardly-tapered portion 15 having a smoothly and uniformly tapered glazed inner surface or bore 16 which is co-axial with the upper cylindrical bore 11 and which forms the glazed seat of the burette-valve to be described below, as in the embodiments shown in Figures 1 to 7, inclusive.

The downwardly-tapered portion 15 is provided with a slight bulge 17 which may form a continuation of the cylindrical outer surface of the main body 10, or may bulge outwardly beyond the same, and which extends downward to a point 18 somewhat below the mid-point of the tapered portion 15, where it bends in to disappear and terminate as shown in Figures 1, 2, 5 and 6.

The bulge 17 has a relatively small circumferential dimension and preferably takes up not more than about one-eighth of the circumference of the tapered portion 15.

The inner surface 19 of (or the channel 19 within) the bulge 17 has formed in it and provides a fluid passageway or by-pass, the function of which will be described below. As indicated particularly in Figure 3 (and similarly in Figures 11, 13 and 14), the radial depth of the channel 19, in relation to the valve-seat bore 16, gradually varies circumferentially; the radial depth being very slight at the edges of the channel 19 and increasing in depth toward the circumferential center of the channel 19.

The lowermost end 14 of the tapered valve-body 15 is ground, to provide a smooth annular surface against which the washer 32 may bear.

A valve-plug, indicated generally by the reference character 21 and shown separately in the exploded view of Figure 4, is constructed and arranged to be mounted in axially-rotatable cooperating relationship with the glazed valve-seat 16. The valve-plug 21 is made of a non-glassy material such as polytetrahaloethylene synthetic resin, polystyrene or a more or less hard rubber having a slight amount of resilient deformability, or other synthetic resins highly inert and resistant to the action of corrosive chemicals and generally form-retaining but capable of yielding slightly under pressure and preferably one having a "soapy" feel and capable of sliding or slipping readily over a glazed vitreous valve-seat surface 16 in what may be called a self-lubricating relationship therewith. Among the polytetrahaloethylene synthetic resins, are polytetrafluoroethylene which is sold commercially by E. I. du Pont de Nemours under the name of "Teflon," and polytrifluorochloroethylene which is sold commercially by M. W. Kellogg Co. under the name "Kel-F."

The valve-plug 21 is provided with an upper downwardly tapered portion 22 having generally the same angle of taper and the same axial dimension as the tapered valve-seat bore 16 of the valve-body 15, so that when the valve-plug is inserted (from the open top of the burette body 10), the tapered portion 22 thereof will provide a continuous area of contact with the tapered valve-seat bore 16, except where it bridges the by-pass channel 19 formed in the bulge 17.

The lower part of the valve-plug 21 may have formed thereon or as an extension thereof, an externally threaded cylindrical portion or stem 23, having generally the same outside diameter as the lowermost end of the tapered valve-portion 22 of the plug 21.

An axial passageway 24 extends upward from the lowermost end 25 of the valve-plug 21 to a point generally intermediate the ends of the tapered portion 22, and a radial passageway or port 26 leads from the upper end of the axial passageway 24 to the outer surface of the tapered valve-portion 22. A short uppermost terminal portion of the valve-plug 21 may be cylindrical, as indicated in Figures 2 and 4. The axial passageway 24 may be countersunk, as at 27, and one or more radial slots 28 may be provided along the lower end of the threaded valve stem 23 (as shown in Figures 2 and 4) to permit the lower threaded end to be contracted slightly under the radially inward pressure of the ring-like lock-nut 34.

The valve-plug 21 may be integrally formed by molding, under the action of heat and pressure, employing any suitable mold; the polytetrahaloethylene synthetic resin and other synthetic resins (and rubber) being thermo-plastic and being capable of conforming accurately to the contour of the mold, upon hardening. The threads on the lower portion 23 may be formed during the molding operation employing a suitably-shaped mold for this purpose or, instead, the lower portion 23 may be molded with a smooth cylindrical outer surface, upon which the threads may thereafter be cut.

The passageways 24 and 26 may also be formed during the molding operation, by use of corresponding mold-cores (the radial one being retractably mounted) or, instead, these passageways may be bored subsequent to the molding operation; employing any appropriate drill or boring tool.

As can be seen particularly in Figure 2, the threaded stem portion 23 of the valve-plug 21 is disposed below and outside of the lower end 14 of the valve-body 15 when the valve-plug 21 is dropped into position with its tapered portion 22 within the valve-seat 16. In this position, the radial passageway 26 is in axial alignment with the lower end of the fluid-by-pass channel 19 so that, by axial rotation of the valve-plug 21, the passageway 26 can be brought into or out of registration with the by-pass channel 19 as shown, respectively, by the pair of solid radial lines and by the pair of dotted radial lines in Figure 3. When the passageway 26 of the valve-plug 21 is in registration with the by-pass 19, liquid from the body 10 of the burette is free to flow downward through the by-pass 19 and the passageways 26 and 24, whereas when the valve-plug 21 is rotated to any position in which the passageway 26 is out of registration with the by-pass channel 19, the fluid-tight seal provided by the tapered valve-surface 22 of the plug 21 and the tapered valve-seat bore 16 will prevent the flow of liquid.

In order to maintain the tapered valve-surface 22 of the valve-plug 21 in somewhat tensioned relationship relative to or in firmer contact with and more fully conformed to the valve-seat 16 and thereby further to insure a fluid-tight seal intermediate the valve-surfaces 22 and 16, a threaded ring, collar or nut 29 is adjustably mounted upon the threaded stem portion 23 of the valve-plug 21.

A seating-ring or washer 32 (also preferably formed of polytetrahaloethylene, polystyrene or the like) and an O-ring or compression-ring (of natural or synthetic rubber or the like) are mounted upon the uppermost portion of the valve-stem 23. The central opening of the ring 29 may be countersunk at its upper end as at 30 (Figure 4), and the O-ring 33 may be confined therewithin as shown in Figures 2, 5, 6 and 8.

The ring or collar 29 is screwed up upon the threaded valve-stem 23 of the valve-plug 21 until the washer 32 is pressed slightly against the end 14 of the valve-body 15. Due to the resilience of the confined O-ring 33, a small amount of downward pull or tension is thus maintained upon the valve-plug 21, such as causes the tapered portion 22 thereof to yield somewhat and to conform more fully and snugly to the glazed tapered seating surface of the valve-seat 16, thereby insuring a fluid-tight seal therebetween.

At the same time, the "soapiness" or self-lubricating property of the polytetrahaloethylene, polystyrene and the like permits easy axial rotation of hte valve-plug 21 without disturbing the fluid-tight seal.

By tightening the ring or collar 29 to a greater or lesser degree, the valve can be "set up" to operate with greater or lesser friction or resistance to turning.

In order to keep the ring, collar or nut 29 from working loose, a separate internally threaded locking-ring or collar or nut 34 may be threadedly mounted on the threaded valve-stem 23 and screwed up until it bears and locks against the underside of the ring or collar 29. The rings 29 and 34 can then be grasped and rotated manually to move the valve-plug 21 to opened or closed position relative to the by-pass channel 19 of the valve-seat 16; thereby to control the escape of liquid from the body 10 of the burette.

The rings 29 and 34 may be formed of any suitable material. For example, these rings may be formed of any suitable commercial moldable synthetic resins (such as "Lucite," "Plexiglas" and the like).

A delivery tip or nozzle 35 may be formed of chemically resistant glass or other vitreous material or of synthetic resins. The tip or nozzle 35 has a relatively small axial bore 36 extending therethrough and is preferably provided with a reduced-diameter upper end 37, constructed and arranged to be detachably connected to the lower end of the valve-plug 21; the upper end 37 fitting snugly within the lower end of the axial passageway 24 of the valve-plug 21. One or more axial slots 28 may be formed in the lower end of the valve-stem 23, to permit it to be tightened firmly about the upper end 37 of the nozzle 35 when the locking-ring 34 is threaded onto the threaded valve-stem 23. However, the slight yieldability of the polytetrahaloethylene, polystyrene and the like also causes the tubular valve-stem 23 to be slightly stretched, axially, when the locking-ring 34 is tightened, thereby resulting in a slight reduction in its inside diameter thereof, thereby also securely to grip the upper end 37 of the nozzle 35 (even without any slot 28 in the lower end of the tubular valve-stem 23).

When the locking-ring 34 is backed off, the delivery tip or nozzle 35 can be pulled free and can be replaced by any one of a number of interchangeable nozzles (not shown) having different sized bores. In this way, the rate of delivery of the liquid from the burette (at full-opening of the valve-plug 21) can be varied, at will, from a relatively slow rate of delivery to a relatively rapid rate of delivery.

In Figure 5 there is shown a modified embodiment of the present invention wherein the valve-plug 21-a has the lower end of its axial passageway 24-a formed as a downwardly-diverging tapered portion 37 (in place of the parallel bore 24 shown in Figures 2 and 6). The slot 28 may be omitted in this embodiment, or it may also be incorporated in this embodiment.

In this embodiment, the delivery tip or nozzle 35-a has its upper end 37-a formed with a taper corresponding to that of the tapered bore 27. The outer tapered upper surface 37-a may be ground or may be glazed.

In this embodiment, the connection between the valve-plug 21-a and the delivery tip or nozzle 35-a may be effected by simply jamming or wedging the tapered end 37-a of the nozzle into the tapered bore 27-a of the tubular valve-stem 23-a.

In Figures 6 and 7 there is shown still another embodiment of the present invention employing a valve-plug 21-b having a tubular valve-stem 23-b which, instead of having a fully cylindrical (threaded) outer surface (as in the embodiments described hereinabove), is formed with a pair of diametrically-opposed, axially-extending flat sides or key-surfaces 38. In this embodiment, the upper ring or collar 29-b has a central opening 31-b which, instead of being screw-threaded as in the embodiments described hereinabove, is of a shape corresponding to the external cross-sectional contour of the valve-stem 23-b; i. e., with diametrically-opposed arcuate surfaces and diametrically-opposed flat surfaces as indicated particularly in Figure 7.

This enables the ring or collar 29-b to be moved axially along the valve-stem 23-b while being keyed thereto, so that it is incapable of rotating relative thereto.

When the lower ring or collar 34 is screw-threadedly engaged upon the lower threaded portion of the valve-stem 23-b, in the manner of the foregoing embodiments, it moves the upper ring or collar 29-b axially toward the lower end of the valve-body 15 until it compresses the O-ring 33 against the seating-washer 32, so as to tension the valve-plug 21-b axially so as to maintain the valve-surface of the valve-plug in fluid-tight axially rotatable relationship to the valve-seat 16 of the valve-body 15. This tension also sets up a pressure between the juxtaposed surface (which are relatively large in area) of the rings 29-b and 34, sufficient to exert a locking action upon the ring 34 and to keep it from inadvertently working loose once it has been tightened.

The juxtaposed rings 29-b and 34 serve as an operating handle to permit axial rotation of the valve-plug 21-b so as to open and close the valve in a manner similar to that described hereinabove.

In this embodiment, the reduced-diameter upper end 37 of the delivery tip or nozzle 35 may be inserted into the lower end 27-b of the axial passageway 24-b of the valve-stem 23-b; the bore 27-b being of such diameter as snugly to receive the upper portion 37 of the nozzle 35.

We have found that sufficient friction is exerted upon the portion 37 to prevent accidental dislodgement of the tip 35, while permitting the tip to be pulled out readily when desired.

We may also provide the lower end of the valve-stem 23-b with one or more radial slots (similar to the slots 28 described hereinabove) to give a firmer gripping action upon the portion 37 of the delivery tip 35.

In the embodiment shown in Figures 9 to 16, inclusive, a parallel-bored or cylindrical-bored valve-housing 15-c is formed at the lower end of the burette-tube 10, with its cylindrical valve-seating surface 16-c of a diameter somewhat less than the diameter 11 of the tube 10, but preferably co-axial therewith or with its axis parallel to the axis of the burette-tube 10, and with the lower end 14-c turned in slightly, to form an in-turned flange 41, as shown in Figures 9 and 10.

In this embodiment, the by-pass channel 19 is likewise formed by forming a bulge 17 on one side of the valve-housing 15-c. The bulge 17, in this embodiment, extends out to the outer diameter of the main burette-body 10, while the greatest radial depth of the channel 19 extends out to (but not beyond) the inner diameter 11 of the main burette-body 10, or just slightly short of the diameter of the burette-bore 11.

While in Figures 9 to 16, inclusive, the valve-bore 16-c is shown co-axial with the burette-bore 11, we may also dispose the valve-bore 16-c eccentrically in relation to the burette-bore 11, but with its axis parallel to the axis of the burette-bore 11. Thus, we may dispose the cylindrical valve-bore 16–c tangentially to the cylindrical burette-bore 11 at the point diametrically opposite to the by-pass channel 19, while projecting the by-pass channel 19 (at its greatest radial depth) just to the diameter of the burette-bore 11, or just short of such diameter. In this eccentric disposition of valve-housing 15–c and valve-bore 16–c in relation to the burette-body 10 and bore 11, the bottom opening 40 (within the in-turned flange 41) will be formed concentrically or co-axially with respect to the valve-bore 16–c.

In this embodiment, a shoulder 42 is formed on the valve-plug 21–c, intermediate the cylindrical valve-body 22–c and the lower tubular valve-stem 23–c; said shoulder 42 bearing against the flange 41.

By reason of the conformability of the valve-plug, a fluid-tight and yet rotatable durable valve-seating is provided between the cylindrical surfaces 16–c and 22–c.

In the embodiment shown in Figure 17, the burette is formed with an in-turned flange 41–d of substantial radial dimension and the opening 40 therein reduced generally to the diameter of the tubular valve-stem 23–d (with some working clearance) and a generally radial and horizontal by-pass channel 19–d is formed in the inner face of the flange 41–d. In this embodiment, the valve-housing 15–d may be formed of the same diameter as the burette-body 10, or of slightly smaller diameter. In this embodiment, the valve 21–d is formed with its valve-seating surface 22–d flat or only slightly convex and facing downwardly and resting on the correspondingly flat or slightly concave inner surface 16–d of the flange 41–d, with the outer diameter of the valve-body 22–d being slightly less than the inner diameter of the valve-housing 15–d, so that the fluid may freely pass the outer diameter of the valve-body 22–d and at all times enter the by-pass channel 19–d. In this embodiment, the generally radial port or passageway 26–d in the valve-body 22–d terminates in a downwardly extending terminal portion which is at a distance from the axis such that it will register with the inner end of the generally radial by-pass channel 19–d when rotated into registration with said channel. The downwardly extending passageway 24–d communicates with the radial passageway 26–d, as in the other embodiments.

The tip or nozzle 35 may be separately formed of glass or quartz and detachably set into the generally tubular non-vitreous valve-stem 23 (in the manner shown in Figures 1, 2, 4, 5, 6 and 9), or it may be formed of the same material as that of the valve-stem 23 and integrally therewith, as indicated in Figure 17.

In the embodiments shown in Figures 1 to 16, inclusive, the tip or nozzle 35 may likewise be formed integrally with the tubular valve-stem 23.

In the embodiment shown in Figure 18, the valve-seating surface 16–e may be likewise a generally flat or slightly concave (or convex) surface as in the embodiment of Figure 17, but instead of being on the inside, it is an external surface, and the valve-retaining flange 41–e is extended outwardly therefrom.

In this embodiment, the generally flat or convex (or concave) seating-surface of the valve-body 22–e is held against the valve-seat 16–e by a retaining-collar 43 having an in-turned flange 44 which engages the outer peripheral portion of the valve-body 22–e. The generally tubular retaining-collar 43 is internally threaded at its upper end, and an annular gland member 45 is threaded thereinto, with an O-ring 33 between the gland 45 and the flange 41–e. A port 19–e is provided, spaced from the center or axis of the structure through the end-wall 46–e. A passageway 26e having its upper end at the same distance from the axis of rotation as the distance of the port 19–e from the axis, and extending toward the center of the valve-body 22–e, is formed in the valve-plug 21–e, and a passageway 24–e extends from the passageway 26–e into the tapered nozzle-receiving bore 27–e of the tubular valve-stem 23–e. A nozzle 35–e, similar to the nozzle 35–a, can be inserted into the tubular valve-stem 23–e.

In lieu of threading the valve-stem 23 and placing threaded rings (such as 29 and 34) thereon, as shown in Figures 1 to 5, inclusive, we may provide an annular groove 46 in the outer surface of the valve stem 23–f, into which a generally U-shaped spring-tensioned locking-ring 47 may be snapped (the distance between the ends of the U being slightly less than the inner or root diameter of the groove 46) as shown in Figures 19 and 20. The locking-ring may bear directly against the end 14 of the valve-housing 15 or against the washer 32, or a flat or "cup" shaped metallic washer 48 may be superimposed upon the locking-ring 47, and a compression spring or rubber or other resilient O-ring interposed between the washer 47 and the end 14 of the valve-housing or between the washer 48 and the non-metallic washer 32, as shown in Figure 19. We may also place a helical compression spring 49 (preferably of stainless steel) in directly interlocking relationship with the groove 46, as shown in Figure 21. The spring 49 is either slightly tapered or its lowermost convolution of smaller diameter, so as to snap into the groove 46. Either of these modified forms of construction (of Figures 19 and 21) we may use in any of the embodiments of Figures 1 to 17, inclusive.

Moreover, in the embodiments shown in Figures 1 to 17, inclusive, and in Figures 19 and 21, the hydrostatic head of the liquid in the burette exerts a force tending to seat the movable valve member 21.

The novel burette construction of the present invention is also more simple to manufacture and can be produced at considerably lower cost than conventional burettes.

Thus, the tapered valve-seats 16 (as shown in Figures 1 to 8 and 19 and 11) as well as the valve seats 16–c (as shown in Figures 9 to 15) and the valve-seat 16–d (indicated in Figure 17) can be formed in the same operation as the body 10 of the burette, employing a shaped mandrel of precision-ground, relatively hard and heat-resistant metal (such as stainless steel) which is accurately dimensioned, within a close tolerance (as for example 0.0001 to 0.0002 inch) onto which a somewhat over-size length of glass or quartz tubing is progressively shrunk under the action of heat and suction; the tubing then being cooled sufficiently to take on a permanent set, after which the mandrel is withdrawn and the tubing is heat-tempered, cooled and finally calibrated. In this way, the cylindrical bore 11 of the burette-body 10 and the bore or shape of the valve-seat 16, 16–c and 16–d of the valve-body or valve-housing 15 are formed quickly and inexpensively in a single more or less unitary and continuous forming operation; the taper or shape of the valve-seat corresponding precisely to the taper or shape of the mandrel; thereby not only dispensing with the need for any further grinding or polishing of the valve-seat, but, indeed, providing an accurately tapered or otherwise shaped glazed valve-seat which is more resistant to the corrosive and deteriorating action of chemicals (which tend to affect glass) than is a ground surface formed on the same kind of glass.

Indeed, the burette-body 10 and the valve-housing and finished valve-seat can be formed at a cost no greater than that involved in forming only the body of conventional burettes.

The valve-plug 21 can also be formed by an extremely simple and inexpensive molding operation so that the cost thereof, when produced in quantity, will be greatly reduced.

The taper or other shape of the upper portion 22 of the valve-plug 21 can be formed with sufficient accuracy during the molding operation and does not require any further cutting, trimming or grinding or other treatment.

The rings 32, 33, 45, 47 and 48, and the collars 29 (or 29–b), 34 and 43 and the tip 35 (or 35–a) can all be formed by extremely simple and inexpensive operations so that their cost may be kept relatively small.

The inertness of the material of the valve-plug and the self-lubricating property of such materials as the polytetrahaloethylenes and polystyrenes, when used in juxtaposition to a glazed vitreous stationary valve-surface, eliminate the necessity of using stopcock grease or other lubricant and permit the burette to be used on many chemicals which could not be handled in conventional burettes due to the harmful action of the chemical on the stopcock grease or other lubricant.

Another advantage of the present invention is that it permits the mass-production of burettes without the need for individual valve-grinding and valve-matching operations, such as are required in conventional burettes (wherein the valve-seat and the plug must be carefully ground and matched to each other in order to prevent leakage). Thus, since all the valve-seats formed on a given mandrel are substantially identical, and since all the valve-plugs formed in a given mold are substantially identical and since the valve-plugs are slightly deformable and conforamble, under pressure, such valve-plugs are fully interchangeable. If a valve-plug should become broken or damaged or lost, it can be replaced by any other valve-plug of the same size, at nominal cost (whereas, if the valve-plug of a conventional burette is lost or broken, it can be replaced only by sending the remainder of the burette to the factory where a new valve-plug must be carefully ground and matched to the valve-seat, at great cost).

The glazed surface of the stationary valve-seat (instead of being ground as in conventional burettes) renders it more resistant to corrosion by the chemical action of the liquids being dispensed by the burette, which not only makes for longer life of the valve but also minimizes contamination of the liquids being handled.

Still another advantage of the novel burette construction of the present invention is that the effective depth of the by-pass channel 19 in the valve-seat gradually varies circumferentially from a relatively small depth adjacent the side-edges 20 of the channel 19 to a relatively greater depth at the circumferential centerpoint of the by-pass 19. This permits more accurate control of flow-rate. Thus, slow rotation of the valve-plug from the closed to the open position results in very gradual increase in flow-rate, from the very low flow-rate to the maximum flow-rate permitted by the valve and the delivery tip. Conversely, slow rotation of the valve-plug from the fully-open position to the closed position results in very gradual throttling of the flow (such as is more difficult to attain or is impossible with conventional burettes), because the passageway or port 26 of the valve-plug is gradually moved to progressively shallower portions of the by-pass 19 so as very gradually to reduce the rate-of-flow of the liquid through the valve. This gradual regulation of flow-rate is important in delicate titrations where there is danger of running beyond the end-point, and hence the present construction permits more accurate titrations.

The rings or collars 29 and/or 34 (and the valve-stems in Figures 19 and 21), which serve as an operating handle for the burette, we may make in different colors so as to distinguish one burette from another where several burettes are used with different titrating reagents or with reagents of different concentrations.

If desired, the outer annular surfaces of these rings 29 and/or 34 (and of the valve-stems in Figures 19 and 21) we may knurl or otherwise roughen to provide a firmer grip. We may increase the diameter of the rings 29 and/or 34 to something greater than that shown in the drawings, to provide greater leverage and ease of operation as well as slower and more readily controlled valve movement.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is claimed as new and desired to be protected by Letters Patent, is the following:

1. A valved vessel comprising a vitreous tubular body, a generally annular valve-seat at one end of said tubular body and disposed generally co-axially in relation thereto, and a rotatable valve-member rotatably seated against said valve-seat and disposed generally co-axially in relation to said body and said valve-seat, and a discharge-tip carried by and extending downwardly from said rotatable valve-member.

2. A valved vessel comprising a vitreous tubular body, a generally annular glazed vitreous valve-seat at one end of said tubular body and disposed generally co-axially in relation thereto, and a rotatable valve-member rotatably seated against said valve-seat and disposed generally co-axially in relation to said body and said valve-seat, and a discharge-tip carried by and extending downwardly from said rotatable valve-member.

3. A valved vessel comprising a vitreous tubular body, a generally annular valve-seat at one end of said tubular body and disposed generally co-axially in relation thereto, and a rotatable non-vitreous valve-member rotatably seated against said valve-seat and disposed generally co-axially in relation to said body and said valve-seat, and a discharge-tip carried by and extending downwardly from said rotatable valve-member.

4. A valved vessel comprising a vitreous tubular body, a generally annular glazed vitreous valve-seat at one end of said tubular body and disposed generally co-axially in relation thereto, and a rotatable non-vitreous valve-member rotatably seated against said valve-seat and disposed generally co-axially in relation to said body and said valve-seat, and a discharge-tip carried by and extending downwardly from said rotatable valve-member.

5. A valved vessel comprising a vitreous tubular body, a generally annular valve-seat at one end of said tubular body and disposed generally co-axially in relation thereto, and a rotatable valve-member rotatably seated against said valve-seat and disposed generally co-axially in relation to said body and said valve-seat, an annular retainer for holding said valve-member against said valve-seat, and a discharge-tip carried by and extending downwardly from said rotatable valve-member.

6. A valved vessel comprising a vitreous tubular body, a generally annular glazed vitreous valve-seat at one end of said tubular body and disposed generally co-axially in relation thereto, and a rotatable non-vitreous valve-member rotatably seated against said valve-seat and disposed generally co-axially in relation to said body and said valve-seat, an annular retainer for holding said valve-member against said valve-seat, and a discharge-tip carried by and extending downwardly from said rotatable valve-member.

7. A valved vessel comprising a vitreous tubular body, a generally annular valve-seat at one end of said tubular body and disposed generally co-axially in relation thereto, and a rotatable valve-member formed of chemically inert relatively hard and form-retaining but somewhat yieldable synthetic resin capable of slipping readily upon a vitreous surface in the manner of self-lubricating relationship therewith, said valve-member being rotatably seated against said valve-seat and disposed generally co-axially in relation to said body and said valve-seat, and a discharge-tip carried by and extending downwardly from said rotatable valve-member.

8. A valved vessel comprising a vitreous tubular body, a generally annular valve-seat at one end of said tubular body and disposed generally co-axially in relation thereto, and a rotatable valve-member formed of chemically inert relatively hard and form-retaining but somewhat yieldable synthetic resin capable of slipping readily upon a vitreous surface in the manner of self-lubricating relationship therewith, said valve-member being rotatably seated against said valve-seat and disposed generally co-axially in relation to said body and said valve-seat, an annular retainer for holding said valve-member against said valve-seat, and a discharge-tip carried by and extending downwardly from said rotatable valve-member.

9. A valved vessel comprising a vitreous tubular body, a generally annular valve-seat at one end of said tubular body and disposed generally co-axially in relation thereto, and a rotatable valve-member formed of a polytetrahaloethylene resin rotatably seated against said valve-seat and disposed generally co-axially in relation to said body and said valve-seat, and a discharge-tip carried by and extending downwardly from said rotatable valve-member.

10. A valved vessel comprising a vitreous tubular body, a generally annular valve-seat at one end of said tubular body and disposed generally co-axially in relation thereto, and a rotatable valve-member formed of a polytetrafluoroethylene resin rotatably seated against said valve-seat and disposed generally co-axially in relation to said body and said valve-seat, and a discharge-tip carried by and extending downwardly from said rotatable valve-member.

11. A valved vessel comprising a vitreous tubular body, a generally annular valve-seat at one end of said tubular body and disposed generally co-axially in relation thereto, and a rotatable valve-member formed of a polytrifluorochloroethylene resin rotatably seated against said valve-seat and disposed generally co-axially in relation to said body and said valve-seat, and a discharge-tip carried by and extending downwardly from said rotatable valve-member.

12. A valved vessel comprising a vitreous tubular body, a generally annular glazed vitreous valve-seat at one end of said tubular body and disposed generally co-axially in relation thereto, and a rotatable valve-member formed of chemically inert relatively hard and form-retaining but somewhat yieldable synthetic resin capable of slipping readily upon a glazed vitreous surface in the manner of self-lubricating relationship therewith, said valve-member being rotatably seated against said valve-seat and disposed generally co-axially in relation to said body and said valve-seat, and a discharge-tip carried by and extending downwardly from said rotatable valve-member.

13. A valved vessel comprising a vitreous tubular body, a generally annular glazed vitreous valve-seat at one end of said tubular body and disposed generally co-axially in relation thereto, and a rotatable valve-member formed of polytetrahaloethylene resin rotatably seated against said valve-seat and disposed generally co-axially in relation to said body and said valve-seat, and a discharge-tip carried by and extending downwardly from said rotatable valve-member.

14. A valved vessel comprising a vitreous tubular body, a generally annular glazed vitreous valve-seat at one end of said tubular body and disposed generally co-axially in relation thereto, and a rotatable valve-member formed of polytetrafluoroethylene resin rotatably seated against said valve-seat and disposed generally co-axially in relation to said body and said valve-seat, and a discharge-tip carried by and extending downwardly from said rotatable valve-member.

15. A valved vessel comprising a vitreous tubular body, a generally annular glazed vitreous valve-seat at one end of said tubular body and disposed generally co-axially in relation thereto, and a rotatable valve-member formed of polytrifluorochloroethylene resin rotatably seated against said valve-seat and disposed generally co-axially in relation to said body and said valve-seat, and a discharge-tip carried by and extending downwardly from said rotatable valve-member.

16. A valved vessel comprising a tubular elongated upper body portion of glazed vitreous material and a lower valve-housing portion of glazed vitreous material, said valve-housing portion having a smooth tapered annular glazed vitreous valve-seat formed therein and having a flow-passage channel interrupting the annular continuity of the upper portion of said valve-seat and extending downwardly to a point axially intermediate the upper and lower ends of said valve-seat, the radially deepest part of said flow-passage channel being at no greater radial distance from the axis of the tubular upper body portion than is the smallest portion of the inner bore of the latter, a valve-plug formed of chemically inert relatively hard and form-retaining but somewhat yieldable nonvitreous material and having an annular tapered valve-surface formed thereon, said valve-surface being seated upon the valve-seat of said valve-housing portion in complementary axially-rotatable sliding relationship therewith, said valve-plug having a tubular valve-stem extending downwardly therefrom, said valve-plug having a fluid passageway extending intermediate the tapered valve-surface thereof and the free end of said valve-stem; and a valve-retainer mounted upon said valve-stem and constructed and arranged to tighten the tapered annular valve-surface of the valve-plug into fluid-tight relationship with the tapered annular valve-seat of the valve-housing portion; said valve-stem being constructed and arranged to be manually axially rotated relative to said valve-seat so as to bring the valve-plug passageway into and out of registration with said flow-passage channel in the stationary valve-seat of the valve-housing, thereby to open and close the valve.

17. A valved vessel comprising a tubular elongated upper body portion of glazed vitreous material and a lower valve-housing portion of glazed vitreous material, said valve-housing portion having a smooth tapered annular glazed vitreous valve-seat formed therein and having a flow-passage channel interrupting the annular continuity of the upper portion of said valve-seat and extending downwardly to a point axially intermediate the upper and lower ends of said valve seat, the radially deepest part of said flow-passage channel being at no greater radial distance from the axis of the tubular upper body portion than is the smallest portion of the inner bore of the latter, a valve-plug formed of chemically inert relatively hard and form-retaining but somewhat yieldable synthetic resin capable of slipping readily upon a glazed vitreous surface in the manner of a self-lubricating relationship therewith, said valve-plug having an annular tapered valve-surface formed thereon, said valve-surface being seated upon the valve-seat of said valve-housing portion in complementary axially-rotatable sliding relationship therewith, said valve-plug having a tubular valve-stem extending downwardly therefrom, said valve-plug having a fluid passageway extending intermediate the tapered valve-surface thereof and the free end of said valve-stem; and a valve-retainer mounted upon said valve-stem and constructed and arranged to tighten the tapered annular valve-surface of the valve-plug into fluid-tight relationship with the tapered annular valve-seat of the valve-housing portion; said valve-stem being constructed and arranged to be manually axially rotated relative to said valve-seat so as to bring the valve-plug passageway into and out of registration with said flow-passage channel in the stationary valve-seat of the valve-housing, thereby to open and close the valve.

18. A valved vessel comprising a tubular elongated upper body portion of glazed vitreous material and a lower valve-housing portion of glazed vitreous material, said valve-housing portion having a smooth tapered annular glazed vitreous valve-seat formed therein and having a flow-passage channel interrupting the annular continuity of the upper portion of said valve-seat and extending downwardly to a point axially intermediate the upper and lower ends of said valve-seat, the radially deepest part of said flow-passage channel being at no greater radial distance from the axis of the tubular upper body portion than is the smallest portion of the inner bore of the latter, a valve-plug formed of chemically inert relatively hard and form-retaining but somewhat yieldable non-vitreous material and having an annular tapered valve-surface formed thereon, said valve-surface being seated upon the valve-seat of said valve-housing portion in complementary axially-rotatable, sliding relationship therewith, said valve-plug having an externally threaded tubular valve-stem protruding beyond the open end of said valve-housing portion, said valve-plug having a fluid passageway extending intermediate the tapered valve-surface thereof and the free end of said valve-stem; and a valve-retainer mounted upon said valve-stem and constructed and arranged to tighten the tapered annular valve-surface of the valve-plug into fluid-tight relationship with the tapered annular valve-seat of the valve-housing portion; said valve-stem being constructed and arranged to be manually axially rotated relative to said valve-seat so as to bring the valve-plug passageway into and out of registration with said flow-passage channel in the stationary valve-seat of the valve-housing, thereby to open and close the valve.

19. A construction according to claim 16 in which the valve-plug is formed of a polytetrahaloethylene resin.

20. A construction according to claim 16 in which the valve-plug is formed of polytetrafluoroethylene resin.

21. A construction according to claim 16 in which the valve-plug is formed of polytrifluorochloroethylene resin.

22. A valved vessel comprising a tubular elongated upper body portion of glazed vitreous material and a lower valve-housing portion of vitreous material, said valve-housing portion having a smooth annular glazed stationary valve-seat formed therein and having a flow-passage channel in said valve-seat extending from said burette-body only partly across said valve-seat, a valve-plug formed of chemically inert relatively hard and form-retaining but somewhat yieldable synthetic resin capable of slipping readily upon a glazed vitreous surface in the manner of a self-lubricating relationship therewith, said valve-plug having an annular valve-surface formed thereon seated upon the stationary valve-seat of said valve-housing portion in complementary axially-rotatable sliding relationship therewith, said valve-plug having an externally threaded tubular valve-stem protruding beyond the open end of said valve-housing portion, said valve-plug having a flow-passage extending intermediate the annular valve-surface thereof and the free end of said valve-stem; and means mounted upon said valve-stem and constructed and arranged to maintain the annular valve-surface of the valve-plug in fluid-tight relationship with the stationary annular valve-seat of the valve-housing portion, said last-mentioned means including an adjusting collar screw-threadedly engaged upon said valve-stem and constructed and arranged to be tightened against the end of said valve-housing portion; said stem being constructed and arranged to be manually axially rotated relative to said valve-seat so as to bring the valve-plug passageway into and out of registration with the flow-passage in the stationary valve-seat and thereby to open and close the valve.

23. A valved vessel comprising a tubular elongated upper body portion of glazed vitreous material and a lower valve-housing portion of glazed vitreous material, said valve-housing portion having a smooth tapered annular glazed valve-seat formed therein and having a fluid-passageway extending from the upepr tubular body portion to a point axially intermediate the ends of said valve-seat; a valve-plug formed of chemically inert relatively hard and form-retaining but somewhat yieldable synthetic resin capable of slipping readily upon a glazed vitreous surface in the manner of a self-lubricating relationship therewith, said valve-plug having an annular tapered valve-surface formed thereon, said valve-surface being seated upon the valve-seat of said valve-housing portion in complementary axially-rotatable sliding relationship therewith, said valve-plug having an externally threaded tubular valve-stem protruding beyond the open end of said valve-housing portion, said valve-plug having a fluid passageway extending intermediate the tapered valve-surface thereof and the free end of said valve-stem; and means mounted upon said valve-stem and constructed and arranged to tighten the tapered annular valve-surface of the valve-plug into fluid-tight relationship with the tapered annular valve-seat of the valve-housing portion, said last-mentioned means including a seating-washer mounted upon said valve-stem in juxtaposition to the end of said valve-housing portion, an O-ring of resilient compressible material mounted upon said stem behind said seating-washer, and an adjusting ring or collar screw-threadedly engaged upon said valve-stem and constructed and arranged to be tightened against the end of said valve-housing portion with said seating-washer and said O-ring interposed therebetween; said stem being constructed and arranged to be manually axially rotated relative to said valve-seat so as to bring the valve-plug passageway into and out of registration with the valve-seat passageway and thereby to open and close the valve.

24. A valved vessel comprising a tubular elongated upper body portion of glazed vitreous material and a lower valve-housing portion of glazed vitreous material, said valve-housing portion having a smooth downwardly-tapered annular glazed valve-seat formed therein, said upper body portion and said lower valve-housing portion being formed integrally and co-axially with each other, said valve-seat having a relatively small bypass depression formed therein extending downward from the upper body portion and terminating at a point axially intermediate the ends of said valve-seat; a valve-plug formed of chemically inert relatively hard and form-retaining but somewhat yieldable synthetic resin capable of slipping readily upon a glazed vitreous surface in the manner of a self-lubricating relationship therewith, said valve-plug having an upper annular downwardly-tapered valve-surface formed thereon, said valve-surface being seated upon the valve-seat of said valve-housing portion in complementary axially-rotatable sliding relationship therewith, said valve-plug having a lower externally threaded tubular valve-stem protruding downward beyond the lower end of said valve-housing portion, said valve-plug having a fluid passageway extending intermediate the tapered valve-surface thereof and the lower end of said valve-stem; and means mounted upon said valve-stem and constructed and arranged to tighten the tapered annular valve-surface of the valve-plug into fluid-tight relationship with the tapered annular valve-seat of the valve-housing portion; said stem being constructed and arranged to be manually axially rotated relative to said valve-seat so as to bring the valve-plug passageway into and out of registration with the valve-seat bypass and thereby to open and close the valve.

25. A construction according to claim 24 in which the valve-plug is formed of polytetrahaloethylene resin.

26. A construction according to claim 24 in which the valve-plug is formed of polytetrafluoroethylene resin.

27. A construction according to claim 24 in which the valve-plug is formed of polytrifluorochloroethylene resin.

28. A construction according to claim 24 in which an axially-bored delivery tip is detachably connected to the lower end of the tubular valve-stem.

29. A valved vessel comprising a vitreous body, a valve-seat formed integrally therewith and disposed generally longitudinally of the body of said vessel and having a fluid-passage channel therein, no portion of which valve-seat and channel extends radially outwardly beyond the projection of the smallest portion of the inner surface of the vessel-body.

30. A valved vessel comprising a vitreous body, a glazed vitreous valve seat formed integrally therewith and disposed generally longitudinally of the body of said vessel and having a fluid-passage channel therein, no portion of which valve-seat and channel extends radially outwardly beyond the projection of the smallest portion of the inner surface of the vessel-body.

31. A valved vessel comprising a vitreous body, a valve-seat formed integrally therewith and disposed generally longitudinally of the body of said vessel and having a fluid-passage channel therein, no portion of which valve-seat and channel extends radially outwardly beyond the projection of the smallest portion of the inner surface of the vessel-body, and a conformable non-vitreous valve-plug in operative juxtaposition to said valve-seat.

32. A valved vessel comprising a vitreous body, a glazed vitreous valve seat formed integrally therewith and disposed generally longitudinally of the body of said vessel and having a fluid-passage channel therein, no portion of which valve-seat and channel extends radially outwardly beyond the projection of the smallest portion of the inner surface of the vessel-body, and a conformable non-vitreous valve-plug in operative juxtaposition to said valve-seat.

33. A valved vessel comprising a vitreous body, a valve-seat formed integrally therewith and disposed generally longitudinally of the body of said vessel and having a fluid-passage channel therein, no portion of which valve-seat and channel extends radially outwardly beyond the projection of the smallest portion of the inner surface of the vessel-body, a conformable non-vitreous valve-plug in operative juxtaposition to said valve-seat, and a discharge tip carried by and extending downwardly from said valve-plug.

34. A valved vessel comprising a vitreous body, a glazed vitreous valve seat formed integrally therewith and disposed generally longitudinally of the body of said vessel and having a fluid-passage channel therein, no portion of which valve-seat and channel extends radially outwardly beyond the projection of the smallest portion of the inner surface of the vessel body, a conformable non-vitreous valve-plug in operative juxtaposition to said valve seat, and a discharge tip carried by and extending downwardly from said valve-plug.

35. A valved vessel comprising a vitreous body, a valve-seat formed integrally therewith and disposed generally longitudinally of the body of said vessel and having a fluid-passage channel therein, no portion of which valve-seat and channel extends beyond the projection of the inner surface of the vessel-body, a conformable non-vitreous valve-plug in operative juxtaposition to said valve-seat, and a valve-retainer for keeping said valve-plug seated upon said valve-seat.

References Cited in the file of this patent

UNITED STATES PATENTS

| | | |
|---|---|---|
| 185,001 | Wasmandorff | Dec. 5, 1876 |
| 1,273,919 | Peed | July 30, 1918 |
| 1,314,265 | Hiergesell | Aug. 26, 1919 |
| 1,993,001 | Geyer | Mar. 5, 1935 |
| 2,163,555 | Geyer et al. | June 20, 1939 |
| 2,571,925 | Mueller et al. | Oct. 16, 1951 |